J. P. Grosvenor's Improvement in adjustable circular saw mitre machines
Old Patent dated Oct. 26. 1869.
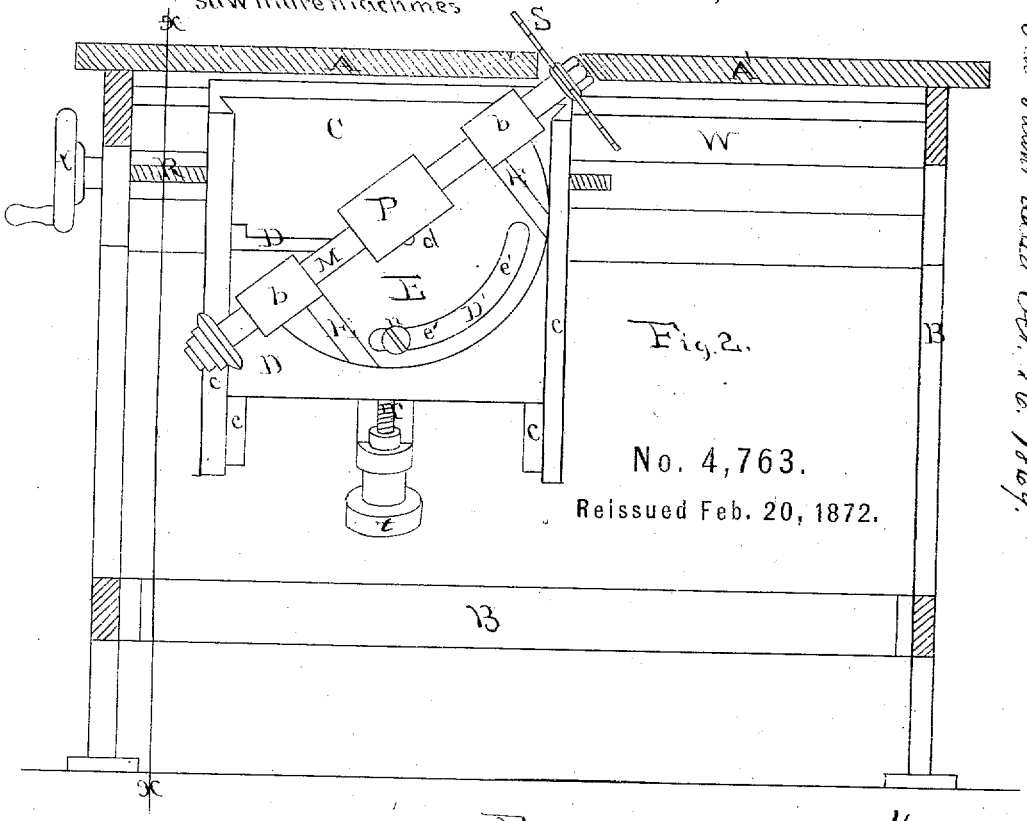
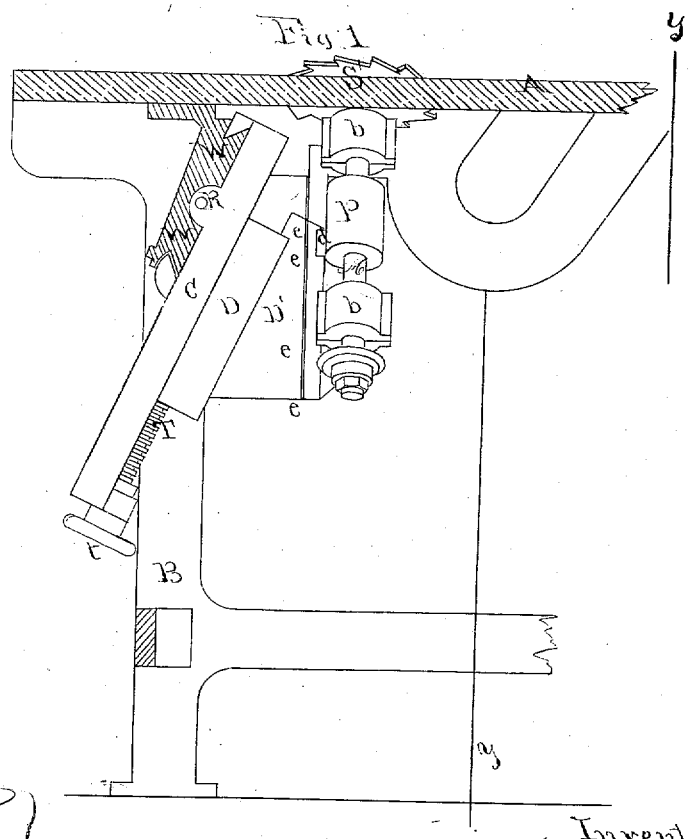
Witnesses
D. Hall Rice
J. N. Marshall
Issued Jan 30 1872
Inventor
J. P. Grosvenor

UNITED STATES PATENT OFFICE.

JONATHAN P. GROSVENOR, OF LOWELL, MASSACHUSETTS.

IMPROVEMENT IN CIRCULAR-SAW MILLS.

Specification forming part of Letters Patent No. 96,224, dated October 26, 1869; reissue No. 4,763, dated February 20, 1872.

SPECIFICATION.

*To all whom it may concern:*

Be it known that I, J. P. GROSVENOR, of Lowell, in the county of Middlesex and State of Massachusetts, have invented a new and Improved Adjustable Circular-Saw Mitering-Machine; and I do hereby declare the following to be a full, clear, and exact description of the construction and operation of the same, reference being had to the accompanying drawing making part of this specification, in which—

Figure 1 is a vertical section through line *x x* of Fig. 2. Fig. 2 is a similar section through line *y y* of Fig. 1.

The object of this invention is to obtain in mitering-machines having a circular saw a more simple, cheap, and perfectly-operating device for adjusting the saw while keeping the belt in its position and taut at all times, and the table level and of uniform height.

The machine is an improvement upon those patented by me May 5, 1868, and September 15, 1868, respectively; the difference between the present and the former inventions consisting in the peculiar device for enabling the saw-mandrel, although hung upon an inclined frame, to be oscillated in a vertical plane. The same construction enables me to raise or depress either end of the mandrel, and by changing the saw from one end to the other its inclination can be adjusted at pleasure in either direction.

In the drawing, A A′ indicate the platform of the saw-table, and B B the supporting-frame. C is an inclined frame sliding longitudinally, with the table, under the platform A A′, being guided by horizontal ways or guides W W, and moved back and forth by a screw-rod, R, having a hand-wheel, *r*, on its outer end. The under side of frame C is provided with guide grooves or ways, and in them slides up and down a second frame, D, moved by another screw-rod, T, having a hand-wheel, *t*, in such a manner that the face *e e e* of the projection D′, hereinafter described, always remains perfectly vertical. The body of the sliding frame D is of uniform thickness, as shown in Fig. 1, where its end appears in front elevation; but cast upon the back of this body is a semicircular projection, D′, thick at its lower edge and thin at its upper edge, its thickness being so proportioned to the inclination of the frame C that its face *e e e* is perfectly vertical. On the vertical face thus formed is hung a semicircular plate, E, having a curved slot, *e′*, near its lower edge, and pivoted at *d* so as to swing edgewise on its pivot in a vertical plane. In Fig. 2 the face of the projection D′ is seen through the slot *e′ e′*. The swinging plate E is provided with bearings *b b* near its ends, which support the saw-mandrel M. S is one of the saws, and P the belt-pulley, which is opposite the pivot *d* of the swinging plate E, that its position may not be materially varied by the movement of the swinging plate upon the pivot. From the pulley P the driving-belt extends downward and back to the lower rear edge of the saw-table, where it is driven by a shaft or counter-shaft. The saw works in an open space between the two parts A A′ of the table, or in a suitable slot provided for the purpose; when preferred, however, it may work at the edge of the table. N is a set-screw, by which the swinging plate E can be fixed at any inclination on the frame D D′.

The inclination of the frames C D is such that they are brought at right angles with the driving-belt when the pulley P is at the point equidistant from the points of its least and greatest practicable elevation by the hand-wheel *t*. The up-and-down adjustment of the frame D, therefore, slackens or tightens the belt so imperceptibly as not to impair its action in the slightest degree. At the same time, although the frame is inclined and moves obliquely, yet the saw-mandrel oscillates in a vertical plane.

It will be observed from what has been said, without further description, that the saws can be adjusted vertically and laterally, as desired, and at any bevel that may be necessary.

Instead of the saw S alone, the combination C D E M may be duplicated on the beam W, and a saw placed on each mandrel, and the device will become an extension saw, cutting both ends of the stick at once, and almost any length could be sawed by arranging both saws on the outer ends of the mandrels, or both on the inner ends, or one on the outer and one on the inner end, &c.

Having described my invention, what I claim as new, and desire to secure by Letters Patent, is as follows:

The combination, herein shown and described, of the frame D, having a projection, D′, with a vertical face, and sliding up and down in grooves or guide-ways *c*, with the swinging plate E and mandrel M, all constructed and operated in the manner and for the purposes herein set forth.

J. P. GROSVENOR.

Witnesses:

D. HALL RICE,

J. N. MARSHALL.